United States Patent [19]

Sakakibara et al.

[11] Patent Number: 4,579,294
[45] Date of Patent: Apr. 1, 1986

[54] SEAT BELT RETRACTOR WITH POWERED REWINDING ARRANGEMENT FOR SLACK-TAKE-UP SPRING

[75] Inventors: Kazuo Sakakibara, Toyokawa; Toshiaki Shimogawa, Okazaki; Satosi Kuwakado, Aichi; Masahiro Iwatsuki, Kariya; Yuji Nishimura, Nagoya; Akinori Fujiwara, Nagoya; Teruhiko Kawaguchi, Nagoya, all of Japan

[73] Assignees: Nippon Soken, Inc., Nishio; Kabushiki Kaisha Tokai Rika Denki Seisakusho, Niwa, both of Japan

[21] Appl. No.: 708,482

[22] Filed: Mar. 5, 1985

[51] Int. Cl.$^4$ .................. B60R 22/46; B65H 75/48
[52] U.S. Cl. .................. 242/107; 280/806
[58] Field of Search .......... 242/107, 107.4 R–107.4 E; 280/806, 807; 297/475–478

[56] References Cited

U.S. PATENT DOCUMENTS

| 4,447,017 | 5/1984 | Inukai | 242/107 |
| 4,471,918 | 9/1984 | Ando | 242/107 |

FOREIGN PATENT DOCUMENTS

| 58-67461 | 5/1983 | Japan | 242/107 |

*Primary Examiner*—John M. Jillions
*Attorney, Agent, or Firm*—Cushman, Darby & Cushman

[57] ABSTRACT

An emergency locking retractor (ELR) for a safety seat belt system provided with a slack-take-up spring operable to instantaneously bias a belt retracting reel to take-up a slack in the seat belt in an emergency situation of the vehicle. The retractor is further provided with a rewinding mechanism including an electric motor for rewinding the slack-take-up spring after the spring energy thereof has been released. Switching circuits for automatically energizing the electric motor are also possible.

3 Claims, 14 Drawing Figures

SEAT BELT RETRACTOR WITH POWERED REWINDING ARRANGEMENT FOR SLACK-TAKE-UP SPRING

BACKGROUND OF THE INVENTION (1) Field of the Invention

The present invention relates to a seat belt retractor for use in a safety seat belt system of a motor vehicle. More particularly, this invention relates to a seat belt retractor having provisions for rewinding or resetting a spring which is specifically adapted to take up a slack in the seat belt in an emergency situation.

(2) Description of the Related Art

It is well known to use a three-point safety seat belt system to safeguard the occupant of a vehicle seat by restraining the body of the occupant in an emergency situation. Generally, one end of the seat belt is attached to a first securing point anchored to a vehicle floor or a seat itself at a side of the seat. A second securing point, composed of a tongue plate and buckle assembly, is provided at the other side of the seat to form between the first and second points a lap belt section of the seat belt for restraining the lower torso of the occupant. A third securing point, which is in the form of a slip ring attached to a door pillar or a belt-pull-out slot provided at the top of a backrest of the seat, is provided at the same side of and above the first point to form a shoulder belt section diagonally and upwardly extending from the second point to secure the upper torso of the occupant. The other end of the seat belt is finally attached in a retractable manner to a retracting reel of a seat belt retractor which is located on the door pillar or housed within the seat backrest.

In order to avoid imparting unnecessary constraint to the occupant during non-emergency conditions, there has been widely used the so-called emergency-locking-type retractors (ELR) having an inertia responsive latch mechanism. An ELR is designed to retract the seat belt with a relatively small winding force by biasing the retracting reel with a spiral spring having a small torque or spring force. This prevents the seat belt from being fit too tightly around the user and permits the seat belt to be protracted upon application of a small tension thereby affording flexibility of movement to the occupant. In an emergency condition, an inertia sensing element senses sudden deceleration of the vehicle and actuates the latch mechanism to lock the retracting reel, thereby preventing further protraction of the seat belt and preventing the occupant from being thrust forward.

The use of ELR, however, tends to result in some slack in the seat belt. Such slack is unnecessary in emergency situations. Thus, it has been proposed in the art to improve the ELR such that, in an emergency situation, the seat belt is instantaneously tightened to remove slack (Japanese Unexamined Utility Model Publication (Kokai) No. 58-67461, published May 7, 1983). Toward this end, the retractor is provided with a second slack-take-up spring having a stronger spring force than the first retracting spring and connected to a drive shaft mounted rotatably on the retractor body. The drive shaft is coupled with the retracting reel through a one-way clutch which is engaged and disengaged by a trigger mechanism having another inertia sensing element. The slack-take-up spring has been preliminarily wound to build up spring energy therein required to turn the retracting reel through, for example, one revolution. In the emergency condition, the trigger mechanism releases the spring energy stored in the slack-take-up spring and engages the one-way clutch so that the rotational torque applied by the slack-take-up spring to the drive shaft is transmitted to the retracting reel causing it to turn through about one revolution, thereby removing the slack and tightly fastening the belt around the occupant.

This retractor, however, has the disadvantage that, once the spring energy of the slack-take-up spring is released in an emergency situation, the retractor must be removed from the automobile and the drive shaft must be turned by a tool such as a wrench or screwdriver to rewind or reset the slack-take-up spring to restore the spring energy for a subsequent emergency situation.

SUMMARY OF THE INVENTION

Accordingly, the object of the present invention is to provide a seat belt retractor having provisions for rewinding the slack-take-up spring.

Another object of the present invention is to provide an automatic mechanism for rewinding the slack-take-up spring.

According to the invention, there is provided a seat belt retractor having a retractor body and a retracting reel rotatably mounted on the body and to which an end of the seat belt is attached. The retractor includes a first spring such as a sprial spring for biasing the retracting reel in a predetermined rotational direction. The retractor also includes a drive shaft mounted rotatably to the retractor body and arranged coaxially with and adjacent to the retractor reel. The drive shaft is biased in the same direction by a second spring such as a spiral spring serving as a slack-take-up spring and having a spring force greater than that of the first spring. The retractor also includes a normally disengaged one-way clutch which is designed to transmit the rotation of the drive shaft to the retracting reel when a trigger mechanism renders the one-way clutch in an engaged condition. The retractor further comprises a rewinding mechanism including an electric motor and adapted to rewind the slack-take-up spring.

With this arrangement, after the initial spring energy of the second spring is released to take-up the slack in the belt, the electric motor is turned on to rewind the second spring through a desired angle to re-establish spring energy.

In one embodiment, the slack-take-up spring has an inner end connected to the drive shaft and the rewinding mechanism comprises a rewinding gear to which the outer end of the slack-take-up spring is attached and which is arranged coaxially with the drive shaft and is driven by the electric motor. Preferably, the rewinding gear has a barrel portion in which the slack-take-up spring is received.

Preferably, the trigger mechanism comprises a member movable from a first position corresponding to non-detection of the emergency situation into a second position corresponding to detection of such situation and the rewinding mechanism comprises a switching circuit responsive to the movement of the movable member from the first position to the second for automatically energizing the electric motor.

In an alternative embodiment, the slack-take-up spring has an inner end attached to the drive shaft and an outer end secured to the retractor body. In this embodiment, the rewinding mechanism comprises a gearing driven by the electric motor. The output of the gearing is transmitted to the drive shaft through a second one-way clutch which is arranged to rotate the drive shaft in the direction opposite the direction of rotation of the retracting reel. The rewinding mechanism may preferably comprise a switching circuit which energizes the electric motor in such a manner that the gearing is first rotated to engage the second one-way clutch for rewinding the slack-take-up spring and is thereafter rotated in the reverse direction to disengage the second clutch so that the drive shaft may be disconnected from the rewinding gearing.

DESCRIPTION OF THE PREFERRED EMBODIMENTS

The invention will now be described in more detail with reference to the accompanying drawings, wherein equivalent parts and members are designated with like reference numerals.

Figure 1:
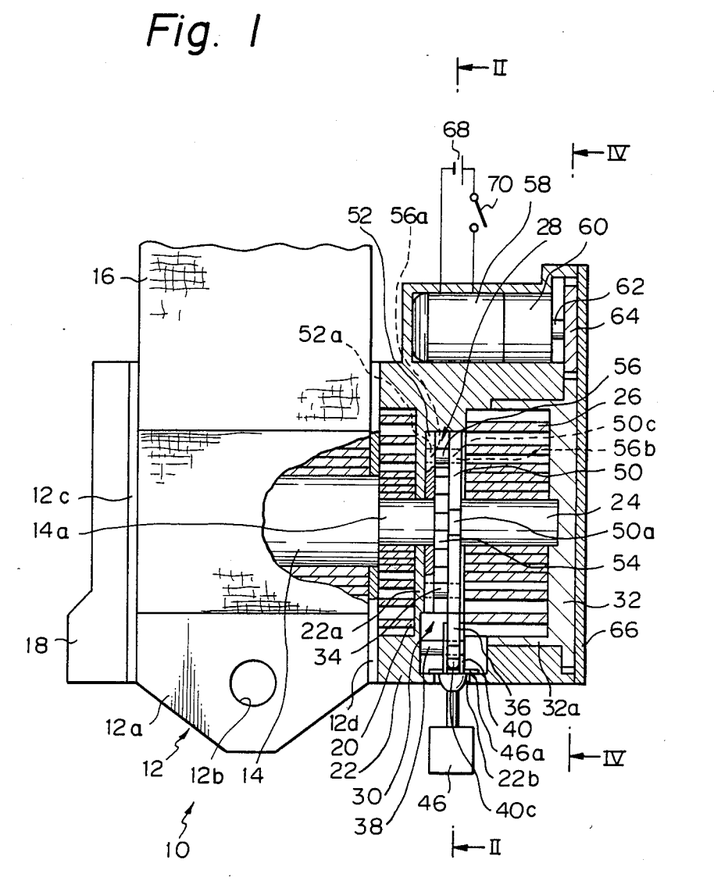
FIG. 1 is a front elevational view, partly in cross-section, of the seat belt retractor according to the first embodiment of the invention.

In FIG. 1, there is shown a seat belt retractor 10 having a frame 12 made from a section of sheet metal channel consisting of a web portion 12a and a pair of flange portions 12c and 12d extending at a right angle from the web 12a. The web 12a is provided with a pair of openings (only one is shown at 12b in the drawing) for passing bolts therethrough to attach the retractor 10 to a suitable part of the vehicle body or seat frame. The flange portions 12c and 12d form the side plates of the frame 12 to which a retracting reel 14 is journaled. An end of a seat belt 16 is attached to the retracting reel 14 in a conventional manner, the seat belt 16 being shown in FIG. 1 as wound around the reel 14 for a number of turns. Secured to the left side plate 12c of the frame 12 is a conventional emergency latch mechanism 18 which includes an inertia sensing element such as a pendulum weight (not shown) swingable in response to a predetermined threshold deceleration of the vehicle and which is adapted to lock the retracting reel in an emergency situation of the vehicle.

Bolted or welded to the right side wall 12d of the frame 12 is a housing 22 having a cavity for receiving a first spiral spring or retracting spring 20, a drive shaft 24, a second spiral spring or slack-take-up spring 26, a clutch mechanism 28, a trigger mechanism 30, a rewinding gear 32, etc. The first spiral spring or retracting spring 20 is received in the housing cavity between the side wall 12d of the frame and a radial wall 22a of the housing 22, with the outer end thereof being securely attached to the housing 22 and the inner end connected to a reduced diameter portion 14a of the retracting reel 14 so that the reel 14 is constantly biased by the retracting spring 20 in the belt retracting direction. As shown, the first retracting spring 20 has a width and a thickness much less than that of the second slack-take-up spring 26 so that the seat belt 16 may be unwound from the reel 14 by applying a relatively small manual force. It will be understood that when the tension in the belt 16 is reduced, the belt 16 will be wound around the reel 14 under the action of the retracting spring 20 and retracted into the retractor 10.

Figure 2:
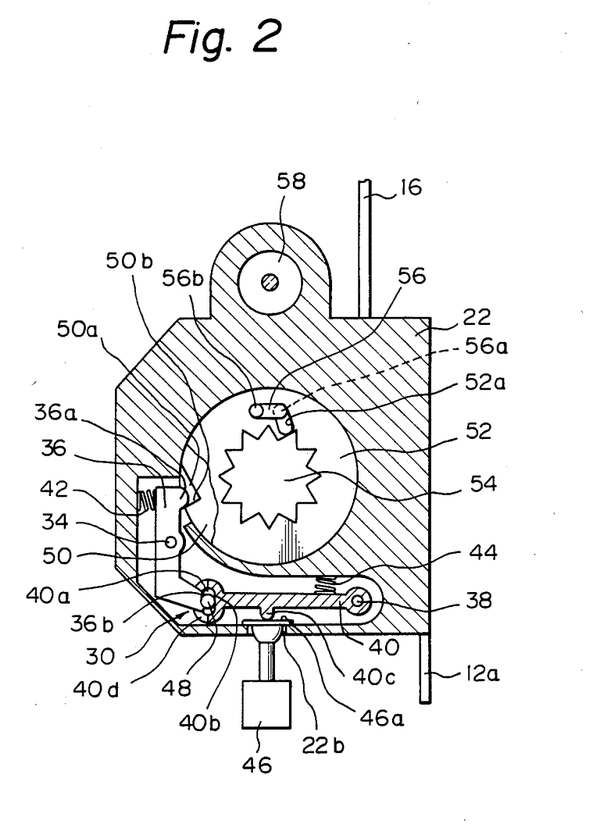
FIG. 2 is a cross-sectional view taken along the line II—II of FIG. 1 and illustrating the trigger mechanism in a latched condition, part of the rotary disc being cut out to show the ratchet wheel and friction plate.
Figure 5:
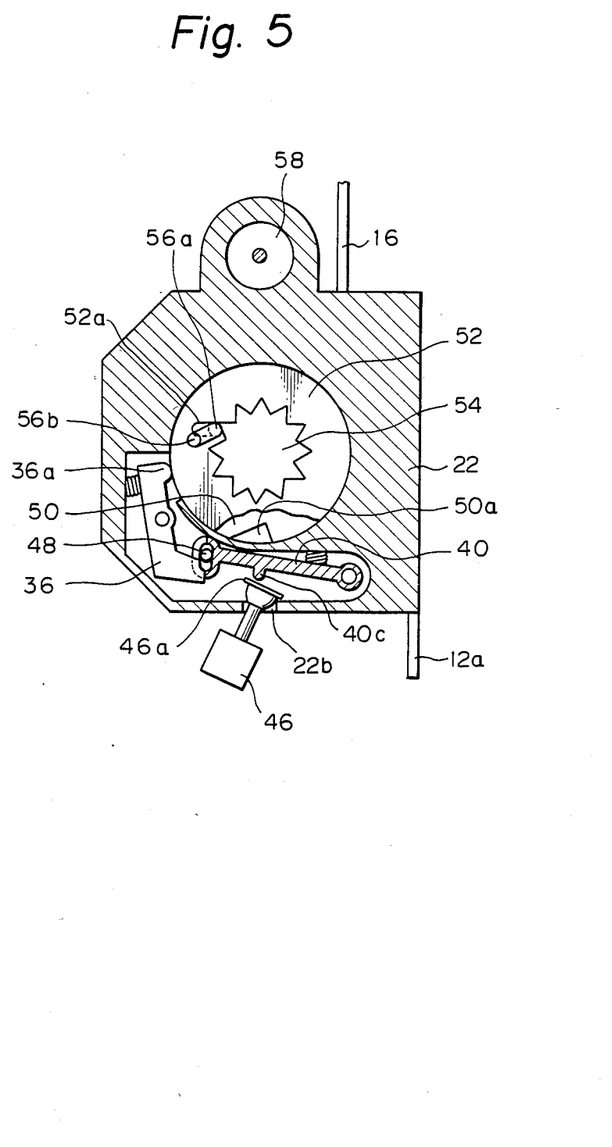
FIG. 5 is a view similar to FIG. 2 but showing the trigger mechanism in a released condition.

As best shown in FIG. 2, the trigger mechanism 30 includes a latch lever 36 pivoted at its center to the radial wall 22a of the housing 22 by a pin 34 extending perpendicularly to the radial wall 22a, a trigger lever 40 pivoted at its end to the wall 22a by another pin 38 perpendicular thereto, a reset spring 42 for biasing the latch lever 36 in the clockwise direction as viewed in FIG. 2, a reset spring 44 for urging the trigger lever 40 in the counter-clockwise direction, a pendulum weight 46 serving as an inertia sensing element and swingably suspended from the housing 22 through an aperture 22b in the housing 22, a roller 48 received in an arcuate slot 40a formed on the free end of the trigger lever 40 and engaging between the opposite ends of the latch lever 36 and trigger lever 40 in the latched condition of the trigger mechanism 30, and a notch 50a formed on a rotary disc 50 (also shown in FIG. 3) rigidly mounted to the drive shaft 24. The notch 50a has a latching surface 50b slightly inclined with respect to the diameter of the flange 50a as shown in FIG. 2. The latch lever 36 has a rounded pawl 36a which is normally engaged with the inclined latching surface 50b. The rotary disc 50 is urged in the clockwise direction as viewed in FIG. 2 by the second spiral spring 26 through the drive shaft 24 so that latch lever 36 is normally biased in the counter-clockwise direction against the action of the reset spring 42. However, in the latched condition of the trigger mechanism 30, counterclockwise movement of the latch lever 36 is precluded since the lower end of the latch lever 36 is in abutting engagement through the roller 48 with the free end of the trigger lever 40. The roller 48 is sandwiched between a bearing surface 36b formed on the lower end of the latch lever 36 and an inner bearing surface 40b of the slot 40a in the free end of the trigger lever 40 and is adapted to roll on these bearing surfaces 36b and 40b. The bearing surfaces 36b and 40b are shaped to form part of concentric cylindrical surfaces having central axis at 38. The free end of the trigger lever 40 is bifurcated by a vertical slit 40d so that the trigger lever 40 may swing about its pivot 38 without interfering with the lower end of the latch lever 36. The trigger lever 40 is urged by the reset spring 44 so that a projection 40c is brought into engagement with a support plate 46a of the pendulum weight 46. Since the bearing surfaces 36b and 40b are concentric with the center 38 of movement of the trigger lever 40, the rotational force that is transmitted through the bearing surface 36b, roller 48, and bearing surface 40b to the trigger lever 40 does not cause any swinging movement of the trigger lever 40 so that the trigger mechanism remains in the latched condition as shown in FIG. 2. However, when the pendulum weight 46 swings due to sudden deceleration exceeding a predetermined value, the support plate 46a of the weight 46 becomes slanted causing the trigger lever 40 to swing clockwise as shown in FIG. 5, whereby the roller 48 rolls on the bearing surface 36b and 40b to eventually disengage from the bearing surface 36b, thereby permitting the latch lever 36 to swing counterclockwise to release the rotary disc 50.

Figure 3:
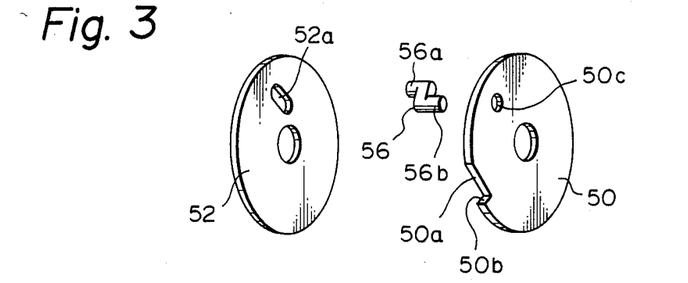
FIG. 3 is an exploded view of three components of the clutch mechanism, with the ratchet wheel being omitted for simplicity.

The one-way clutch mechanism 28 includes the rotary disc 50, a disc-like friction plate 52, a ratchet wheel 54 integral with the retracting reel 14, and an engagement member 56. The friction plate 52 is mounted rotatably around the reduced diameter portion 14a of the reel 14 and is slidably sandwiched between the radial wall 22a of the housing 22 and the ratchet wheel 54. As shown in FIGS. 2 and 3, the friction plate 52 has a cam slot 52a inclined inwardly and forwardly with respect to the direction of rotation of the retracting reel 14. The engagement member 56 is provided with a pair of parallel pins 56a and 56b extending in a staggered manner in the opposite directions as shown in FIG. 3. One of the pins, 56a, is slidably engaged in the cam slot 52a of the friction plate 52 and the other pin 56b is rotatably received in a circular opening 50c in the rotary disc 50. The rotary disc 50, through the intervention of the engagement member 56, urges the friction plate 52 into frictional engagement with the radial wall 22a of the housing 22 so that the friction plate will not be rotated until it is subjected to a torque larger than the frictional force. The friction plate 52 may be made in the form of a Belleville spring or a spring washer.

A sufficient clearance is provided between the ratchet wheel 54 integral with the reel 14 and the rotary disc 50 secured to the drive shaft 24 so that the ratchet wheel 54 and the disc 50 may rotate without interferring with each other when the one-way clutch 28 is disengaged. The cam slot 52a is so shaped that when the drive shaft 24 together with the rotary disc 50 are rotated in the clockwise direction as viewed in FIG. 2 to in turn rotate the clutch engagement member 56 in the same direction, the pin 56a of the engagement member 56 is guided along the slot 52a to bring the engagement member 56 into engagement with any one of the teeth of the ratchet wheel 54. Conversely, as the drive shaft 24 is turned in the counterclockwise direction, the engagement member 56 is moved away from the ratchet wheel 54. In the latched condition of the trigger mechanism 30, the clutch engagement member 56 is disengaged from the ratchet wheel 54 as shown in FIG. 2 so that the retracting reel 14 may rotate freely.

The rewinding gear 32 is received rotatably within the housing 22 and rotatably supports an end of the drive shaft 24. The rewinding gear 32 may preferably have an integral barrel portion 32a in which the second spiral spring of slack-take-up spring 26 is received. The outer end of the spring 26 is attached to the barrel portion 32a while the inner end thereof is connected to the drive shaft 24. The slack-take-up spring 26 has a spring force sufficient to instantaneously rewind the seat belt 16 when the trigger mechanism 30 is activated.

Figure 4:
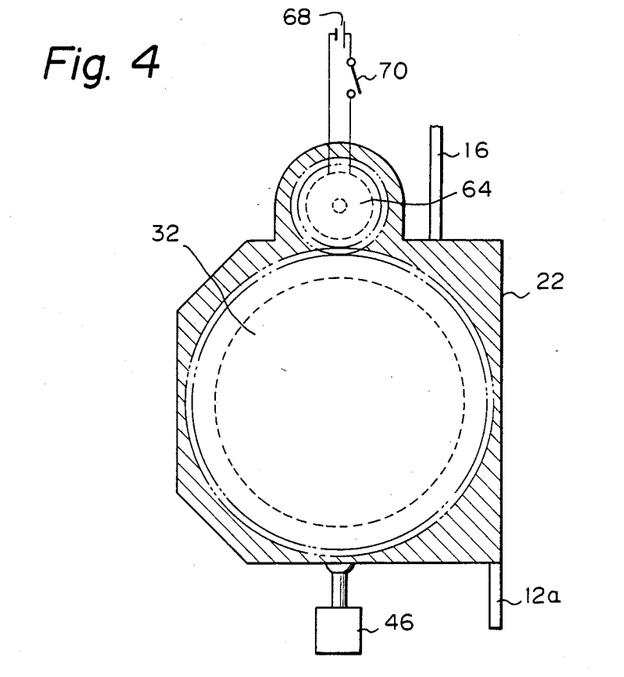
FIG. 4 is a cross-sectional view taken along the line IV—IV of FIG. 1.

The housing 22 also receives an electric motor 58 connected to a reduction gear mechanism 60, the output shaft 62 of which is connected to a spur gear 64 meshing with the rewinding gear 32 as shown in FIGS. 1 and 4. The end of the housing 22 opposite the retractor frame 12 is closed by a cover 66 bolted thereto. The motor 58 in connected to a battery 68 through a manually operable switch 70.

The operation of the retractor 10 is as follows. Initially, the slack-take-up spring 26 has been reset to build up spring energy therein sufficient to turn the drive shaft 24 for approximately one revolution. Normally, the latch mechanism 18 is in an unlatched or released condition to allow protraction of the seat belt 16, while the trigger mechanism 30 is in a latched condition as shown in FIG. 2 with the pawl 36a of the latch lever 36 engaging the notch 50a of the rotary disc 50. Thus, the drive shaft 24 is under the biasing force of the slack-take-up spring 26 but does not rotate the rotary disc 50. As the engagement member 56 receives no torque from the rotary disc 50, the engagement member 56 assumes the position shown in FIG. 2 in which the pin 56a is located at the outer end of the cam slot 52a so that the engagement member 56 is out of engagement with the ratchet wheel 54. Therefore, the clutch mechanism 28 disconnects the retracting reel 14 from the drive shaft 24. The retracting reel 14 is constantly subjected to the action of the retracting spring 20, the spring force of which, however, is preset adequately small so as not to give an excessive constraint to the user of the safety seat belt system. Accordingly, slack would be formed in the seat belt, thereby preventing the seat belt 16 to be tightly fit around the body of the user. Also, the seat belt 16 may be protracted from the retractor 10 in response to the movement of the user's body.

When the vehicle is subjected to deceleration greater than a predetermined threshold value in an emergency situation of the vehicle such as sudden and intense braking, the pendulum weight 46 will swing into a slanted position as shown in FIG. 5 with its support 46a lifting the projection 40c of the trigger lever 40, causing it to swing upwardly away from the lower end of the latch lever 36. During this movement, the trigger lever 40 will swing quite smoothly due to the presence of the antifriction roller 48 rolling on the bearing surfaces 36b and 40b. The roller 48 will eventually roll off the bearing surface 36b thereby releasing the latch lever 36 from the trigger lever 40 and permitting the latch lever 36 to swing counterclockwise under action of the slack-take-up spring 26 acting through the drive shaft 24 and the rotary disc 50 on the pawl 36a to slide it out along the inclined surface 50b. This triggers the release of spring energy built-up in the slack-take-up spring 26 as well as the rotation of the rotary disc 50 so that the engagement member 56 supported by the disc 50 with one pin 56b engaged in the opening 50c of the disc 50 will rotate together with the rotary disc 50, thereby causing the other pin 56a to slide inwardly along the cam slot 52a into engagement with the ratchet wheel 54 as shown in FIG. 5. As a result, the rotary disc 50 is coupled with the ratchet wheel 54 and the drive shaft 24 is drivingly connected by the one-way clutch 28 to the retracting reel 14. As the rotary disc 50 turns further, the pin 56a abuts against the inner end of the cam slot 52a in the friction plate 52 thereby transmitting the spring force or torque of the spring 26 to the friction plate 52. As the torque overcomes the frictional force exerted between the plate 52 and the radial wall 22a of the housing 22, the friction plate 52 is rotated together with the rotary disc 50. In this manner, the spring force of the slack-take-up spring 26 is transmitted through the one-way clutch 28 to the retracting reel 14 causing it to rotate clockwise as viewed in FIGS. 2 and 5. Since the spring force of the slack-take-up spring 26 is preset to be much larger than that of the retracting spring 20, the seat belt 16 is tightened instantaneously and with a strong retracting force so that a slack in the seat belt is removed to snugly fit the belt around the seat occupant. The emergency latch mechanism 18 for the retracting reel 14 is latched almost simultaneously with the release of the trigger mechanism 30 and will prevent protraction of the seat belt once tightened. Thus, the occupant is securely retained in position in the vehicle seat.

It is believed that rotation of the retraction reel for one revolution is generally sufficient to take up the seat belt slack in an emergency situation. Thus, the slack-take-up spring 26 may be designed to store spring energy required to rotate the drive shaft 24 for one revolution. However, if the spring 26 is accommodated to store more energy, a stop mechanism such as a stop pin may be provided on the drive shaft 24 to limit the rotation of the drive shaft more than one revolution.

The threshold deceleration at which the trigger mechanism 30 is released may be adjusted by selecting the angle of inclination of the latch surface 50b of the notch 50a in the rotary disc 50, by altering the lever ratio between the latch lever 36 and the trigger lever 40, by adjusting the spring force of the reset springs 42 and 44, or by changing the length and mass of the pendulum weight 46. The trigger mechanism may preferably be preset to release at a deceleration of about 5G.

The operation of the mechanism for rewinding or resetting the slack-take-up spring 26 will be described below.

After tightening the seat belt 16, it is likely that some spring energy still remains in the slack-take-up spring 26. In that event, when the occupant detaches the seat belt, the belt will be first retracted into the retractor 10 by the retracting reel 14 rotated under action of both the retracting spring 20 and slack-take-up spring 26. As the rotary disc 50 performs one complete revolution from the initial latched position, the notch 50a of the rotary disc 50 will again be brought into registration with the pawl 36a of the latch lever 36, thereby allowing the pawl 36a to be urged by the reset spring 42 to engage into the notch 50a, whereby the latch lever 36 swings to resume the position shown in FIG. 2. The reset spring 44 biases the trigger lever 40 to swing it back to the initial position so that the roller 48 will fall along the slot 40a to again engage with the bearing surface 36b, thereby resetting the trigger mechanism 30. Thereafter, the seat belt 16 will be retracted only by the action of the retracting spring 20. As the retracting spring 20 rotates the reel 14 in the clockwise direction as viewed in FIG. 2, the ratchet wheel 54 secured to the retracting reel 14 is rotated in the same direction. This causes the engagement member 56 to move away from the teeth of the ratchet wheel 54. Since the rotary disc 50 is locked by the latch lever 36 and is therefore no longer rotatable, the engagement member 56 will turn about its pin 56b causing the other pin 56a to slide along the cam slot 52a, thereby rotating the friction plate 52 in the clockwise direction. As a result, the engagement member 56 is disengaged from the ratchet wheel 54, whereby the one-way clutch 28 is brought in a released condition in which the retracting reel 14 is disconnected from the drive shaft 24.

The user then turns on the switch 70 to energize the electric motor 58 which drives through the reduction gear 60 the spur gear 64 in the counterclockwise direction as viewed in FIG. 4, thereby rotating the rewinding gear 32 in the clockwise direction. Since the drive shaft 24 to which the inner end of the spring 26 is attached is locked by the latch lever 36 engaging the rotary disc 50, the slack-take-up spring 26 is rewound and loaded as the rewinding gear 32 retaining the outer end of the spring 26 rotates. The switch 70 may be turned off after a sufficient spring energy is reestablished in the spring 26.

In the embodiment described above, the electric motor is adapted to be energized and de-energized by manually operating the switch 70. However, the retractor may be modified in such a manner that, upon release of the spring energy of the slack-take-up spring, the motor is automatically energized to reset the slack-take-up spring.

Figure 6:
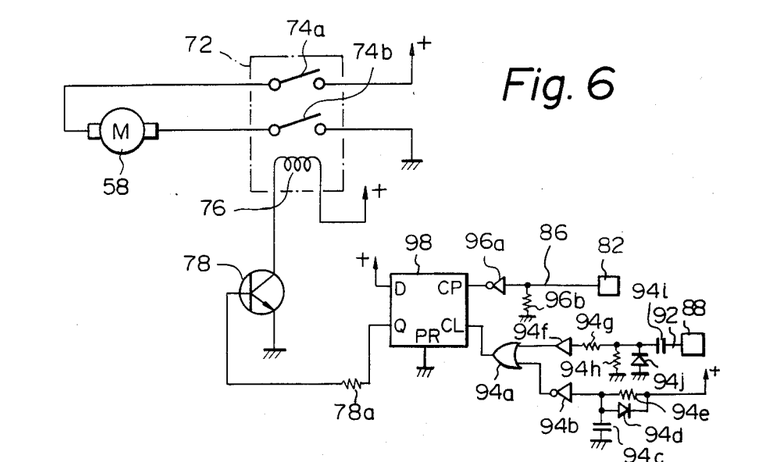
FIG. 6 is a wiring diagram of the switching circuit suitable for use in the retractor according to the first embodiment.

FIGS. 6 through 9 illustrate such a modified version of the retractor. In FIG. 6, there is shown a switching circuit suitable for use in the automatic rewinding mechanism. The switching circuit includes a relay 72 having a pair of movable contacts 74a and 74b connected in series with the motor 58. A relay coil 76 for controlling the movable contacts 74a and 74b is connected to the collector of a transistor 78. The base of the transistor 78 is connected through a resistor 78a to the Q output terminal of a flip-flop 98. The data input terminal D of the flip-flop 98 is connected to the power source, and the clock pulse input terminal CP of the flip-flop 98 is connected to an inverter 96a, which is connected through a lead wire 86 to a reed switch 82 described later. The input terminal of the inverter 96a is grounded through a resistor 96b. The clear signal input terminal CL of the flip-flop 98 is connected to an OR circuit 94a having two input gates, one of which is connected through a non-inverter 94f to a capacitor 94i, which is connected through a lead wire 92 to another reed switch 88 described later. The lead between the capacitor 94i and the resistor 94g is grounded through a resistor 94h and a diode 94j. The capacitor 94i and the resistor 94h together form a differentiation circuit which differentiates changes in the output from the reed switch 88 and issues an impulse to the non-inverter 94f when there is a rise in the output from the reed switch 88. The resistor 94g is provided to protect the non-inverter 94f. The diode 94j serves to prevent a negative impulse from being issued from the differentiation circuit when a fall occurs in the reed switch output. The other input gate of the OR circuit 94a is connected through an inverter 94b and a resistor 94e to the power source. A diode 94d is connected in parallel with the resistor 94e. The input gate of the inverter 94b is grounded through a capacitor 94c.

Figure 7:
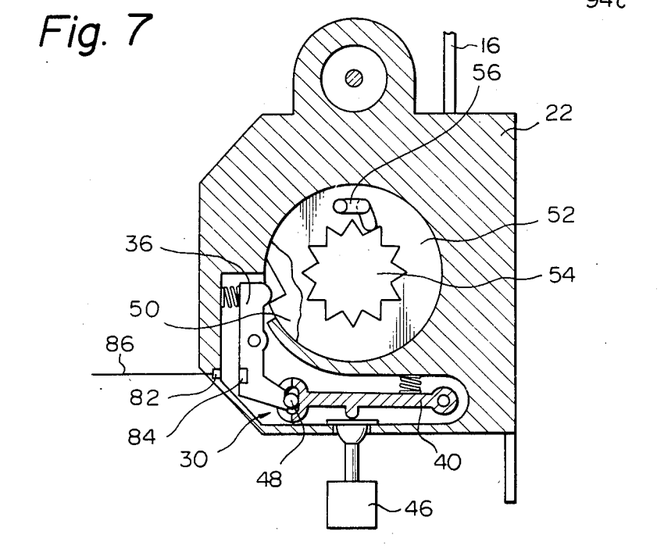
FIGS. 7 and 8 are views similar to FIGS. 2 and 5 but showing the retractor modified to arrange a read switch used in the switching circuit of FIG. 6.
Figure 8:
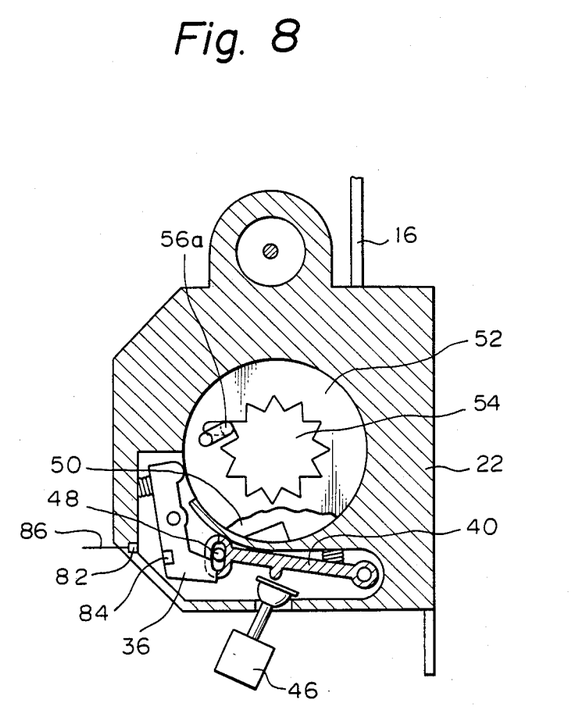
Figure 9:
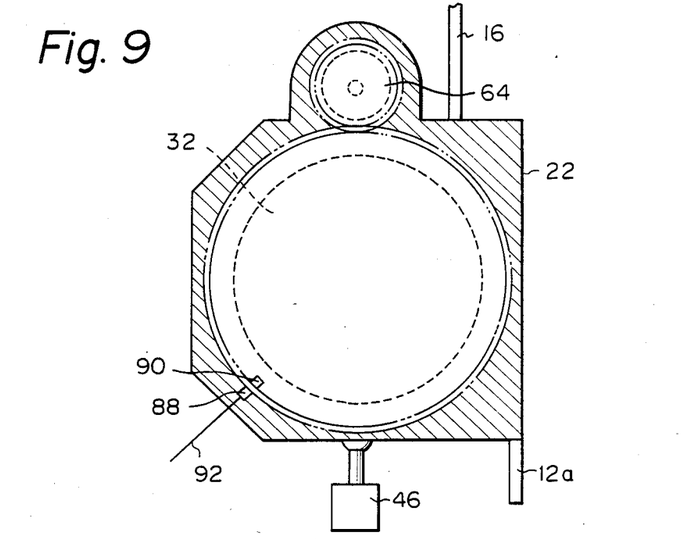
FIG. 9 is a view similar to FIG. 4 but illustrating the position of another reed switch used in the switching circuit of FIG. 6.

The reed switches 82 and 88 may be of the magnetically operated type. The reed switch 82 may be mounted on the retractor housing 22 at a position opposite the lower part of the latch lever 36, as shown in FIGS. 7 and 8. A segment of permanent magnet 84 is mounted on the latch lever 36 in alignment with the reed switch 82. The reed switch 82 is connected to the inverter 96a by a lead 86. The other reed switch 88 is mounted on the retractor housing 22 at a suitable position opposite the outer periphery of the rewinding gear 32 or the barrel portion 32a, as shown in FIG. 9. A cooperating permanent magnet segment 90 is mounted on the rewinding gear 32 or the barrel portion 32a in such position that it faces the associated reed switch 88 as shown in FIG. 9 when the rewinding gear 32 is in the initial position in which the slack-take-up spring 26 is rewound through a desired angle. The reed switch 88 is connected through the lead wire 92 to the capacitor 94i.

When an ignition switch or key switch (not shown) of the automobile is turned on to supply electric power to the switching circuit illustrated in FIG. 6, the electric current flows through the resistor 94e toward the capacitor 94c, thereby starting the charging of the latter. Until the capacitor 94c is charged to a predetermined threshold potential level, a low potential signal is applied to the inverter 94b so that the inverter 94b issues a high potential signal to the OR circuit 94a which, in turn, issues a high potential clear signal to the CL input terminal of the flip-flop 98 as shown at the time point A in the time chart of FIG. 10, thereby ensuring that the Q output terminal of the flip-flop 98 issues a zero level signal. Thus, the transistor 78 remains de-energized to, in turn, maintain the relay 72 and the motor 58 in a de-energized state. In this manner, each time electric power is applied to the switching circuit, a clear signal is applied to the CL terminal of the flip-flop 98 to ensure that the motor 58 remains de-energized. Shortly thereafter, the capacitor 94c will be charged to a threshold level so that the output applied from the inverter 94b to the OR circuit 94a becomes zero level, whereby the control signal or clear signal applied from the OR circuit 94a to the CL terminal of the flip-flop 98 is turned from the high to zero level, as shown in FIG. 10.

As long as the trigger mechanism 30 is in a latched condition, as shown in FIG. 7, the magnet 84 turns on the reed switch 82 to issue a high potential signal which is inverted to a zero level signal by the inverter 96a so that no high level signal is applied to the CP input terminal of the flip-flop 98. Thus, the output from the Q output terminal of the flip-flop 98 is maintained at zero.

Figure 10:
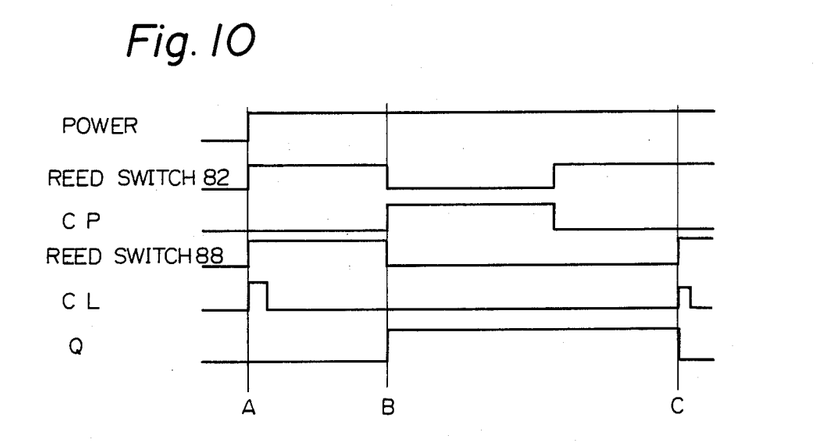
FIG. 10 is a time chart showing the sequence of operation of the switching circuit.

When the trigger mechanism 30 is unlatched in an emergency condition of the vehicle at the time point B illustrated in the time chart of FIG. 10, the latch lever 36 swings as shown in FIG. 8, thereby bringing the magnet 84 away from the reed switch 82. As a result, the reed switch 82 is turned off and issues a zero level signal which is inverted by the inverter 96a to a high level signal, which is fed to the CP terminal of the flip-flop 98. Since the flip-flop 98 is designed to be responsive to a rise of the input signal applied to the CP terminal, and because at this moment the control signal applied to the CL terminal is zero level, the flip-flop 98 is turned to issue a high level signal from the Q output terminal so that the transistor 78 is energized to activate the relay coil 76, which closes the contacts 74a and 74b for energization of the motor 58. As the motor 58 rotates, the slack-take-up spring 26 is rewound and the latch lever 36 swings into the initial latched position so that the reed switch 82 is turned on.

As the motor 58 rotates further, at the time point C illustrated in FIG. 10, the rewinding gear 32 is turned back to the initial position as shown in FIG. 9, so that the reed switch 88 is turned on and issues a high level signal. The rise in the signal from the reed switch 88 is differentiated by the differentiation circuit 94i/94h, which issues a pulse signal which is processed by the non-inverter 94f for waveform shaping and is fed to the OR circuit 94a. As a result, the OR circuit 94a issues a high level signal to the CL terminal of the flip-flop 98 so that the Q output is turned over from the high to zero level, thereby de-energizing the transistor 78, relay 72 and motor 58. Thus, the slack-take-up spring 26 is rewound and the trigger mechanism is reset for the next operation as described above.

Figure 11:
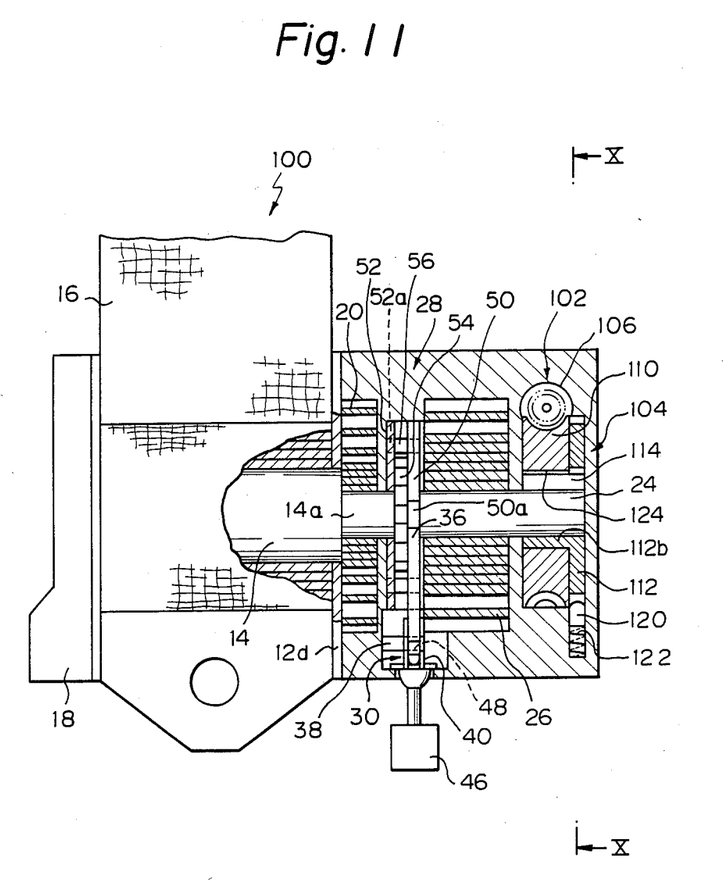
FIG. 11 is a front elevational view, partly in cross-section, of the retractor according to the second embodiment of the invention.
Figure 12:
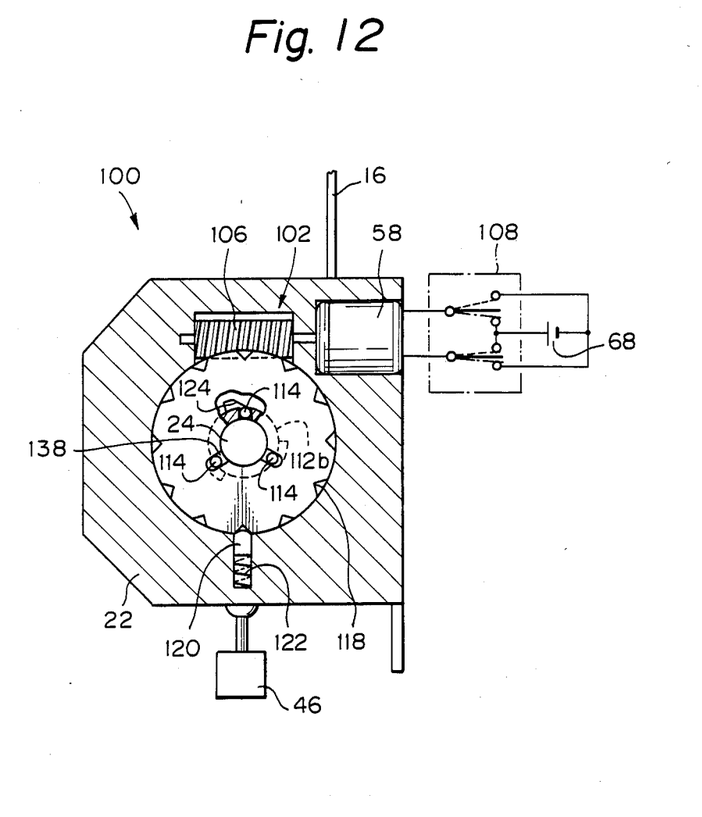
FIG. 12 is a cross-sectional view taken along the line X—X of FIG. 11, with the flange of a retainer partly cut out to illustrate the second clutch mechanism.
Figure 13:
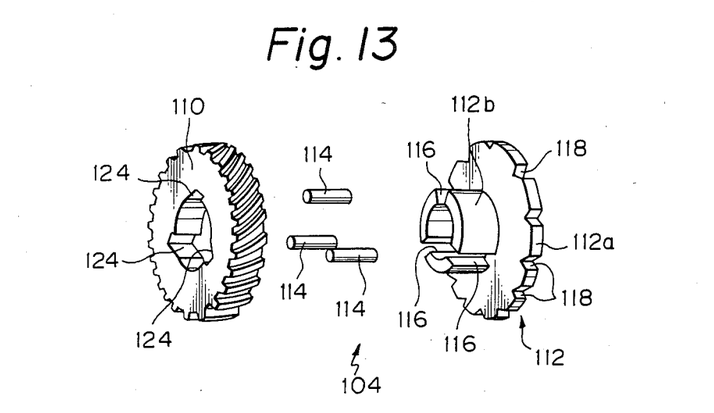
FIG. 13 is an exploded view of the second clutch mechanism.

Referring to FIGS. 11 through 13, there is shown the second embodiment 100 of the invention. This embodiment differs from the first embodiment in that the outer end of the slack-take-up spring is attached to the housing instead of being secured to the rewinding gear and that the rewinding mechanism is adapted to rotate the drive shaft for resetting the slack-take-up spring. Parts and members equivalent to the first embodiment are indicated by the same reference numerals and will not be described again. Only the different parts and members will be described hereinafter.

In this embodiment, the slack-take-up spring 26 has an outer end anchored to the housing 22 and an inner end connected to the drive shaft 24. The drive shaft 24 is longer than that of the first embodiment and extends into a retainer of a second one-way clutch, described later.

The rewinding mechanism includes a gearing 102 and a second one-way clutch 104. The gearing 102 includes a worm gear 106 connected to and driven by the electric motor 58 and received rotatably within the housing 22. The electric motor 58 is connected to the battery 68 through a four-contact two-way switch 108. The gearing 102 also includes a worm wheel 110 arranged rotatably within the housing 22 coaxially with the drive shaft 24 and meshing with the worm gear 106.

As best shown in FIG. 13, the second one-way clutch 104 includes a retainer 112 and three coupling pins 114. The retainer 112 is mounted rotatably within the housing 22 and rotatably receives the drive shaft 24. The retainer 112 has a flange portion 112a and a boss portion 112b about which the worm wheel 110 is rotatably mounted. As best shown in FIG. 13, the retainer boss 112b is split into three parts by three slots 116 angularly equally spaced apart with each other and extending axially and radially. Each slot 116 is so sized to loosely receive respective coupling pins 114, and the radial wall thickness of the retainer boss portion 112b is selected to be slightly larger than the diameter of the pins 114. The retainer flange 112a is provided with a plurality of notches 118 as shown in FIG. 13. As shown in FIGS. 11 and 12, a pin 120 is received within a radial hole in the housing 22 and is biased inward by a compression spring 122 into engagement with any one of the notches 118. The notches 118 and the pin 120 together form means for imparting to the retainer 112 frictional resistance to its rotation. The one-way clutch 104 further includes three equally spaced wedge surfaces 124 formed on the central bore of the worm wheel 110. As shown in FIG. 12, the wedge surfaces 124 are curved inward along the winding direction of the retracting reel 14 so that, when the worm wheel 110 is rotated in the unwinding direction (counterclockwise direction as viewed in FIG. 12), the coupling pins 114 received in respective slots 116 are urged inward into frictional engagement with the drive shaft 24 to couple the worm wheel 110 with the drive shaft 24. When the worm wheel 110 is rotated clockwise, the coupling pins 114 will move radially outward away from the drive shaft 24 thereby disconnecting the drive shaft 24 from the worm wheel 110.

The retractor 100 according to the second embodiment operates in more or less the same manner as in the first embodiment. That is, in the normal condition, the first one-way clutch 28 is disengaged so that the seat belt 16 may be protracted with a relatively small manual force.

In an emergency situation, the trigger mechanism 30 is unlatched and the first one-way clutch 28 is engaged to wind up the retracting reel 14 as described with reference to the first embodiment so that a slack in the seat belt is removed and the belt 16 is snugly fit around the occupant. During this winding rotation of the reel 14, the rewinding mechanism will not preclude the rotation of the drive shaft 24 since the second one-way clutch 104 is disengaged and, therefore, the worm wheel 110 is disconnected from the drive shaft 24.

After the emergency situation is over, the occupant operates the switch 108 to reset the slack-take-up spring 26. Toward this end, the user first places the switch 108 into the position as shown by the dotted line in FIG. 12 so that the motor 58 drives the worm wheel 110 in the counterclockwise direction as viewed in FIG. 12. Such rotation of the worm wheel will bring by wedging action the coupling pins 114 into engagement with the drive shaft 24 whereby the worm wheel 110 is drivingly coupled to the drive shaft 24. As the motor rotates the worm wheel 110 further, the drive shaft 24 is turned counterclockwise or in the belt-unwinding direction, thereby rewinding the slack-take-up spring. Rewinding is continued until the pawl 36a of the latch lever 36 engages into the notch 50a of the rotary disc 50 and the trigger mechanism 30 is again latched as shown in FIG. 2. During rewinding, the rotary disc 50, integral with the drive shaft 24, is rotated counter-clockwise so that the clutch engagement member 56 carried by the rotary disc 50 is moved away from the ratchet wheel 54, thereby disengaging the first clutch 28. Thus, the rotation of the drive shaft 24 for the purpose of rewinding the slack-take-up spring 26 does not affect the retracting reel 14.

Upon completion of rewinding of the spring 26, the switch 108 is shifted into the position shown by the chain line in FIG. 12 to turn the motor 58 in the reverse direction and to rotate the worm wheel 110 in the clockwise direction as viewed in FIG. 12. Since the retainer 112 undergoes frictional resistance to rotation with respect to the retractor housing 22 due to the pin 120 engaging with the notches 118, such clockwise rotation of the worm wheel 110 will permit the coupling pins 114 to retract outward along the wedge surfaces 124 away from the drive shaft 24, thereby resetting the second one-way clutch 104 in the initial disengaged condition so that the drive shaft 24 may rotate without interfering with the rewinding mechanism to take up the seat belt slack in any subsequent emergency situation.

In the second embodiment, the slack-take-up spring 26 must be designed or a suitable stop mechanism arranged such that the rotary disc 50 rotates through less than one revolution when the slack-take-up spring is released, in order that the latch lever 36 does not preclude rotation of the drive shaft 24 during rewinding.

Similar to the first embodiment, the second embodiment may be modified in such a manner that after the emergency condition has passed, the motor 58 is first rotated in the spring rewinding direction until the slack-take-up spring 26 is rewound. The motor may then be rotated in the reverse direction until the second one-way clutch is disengaged.

Figure 14:
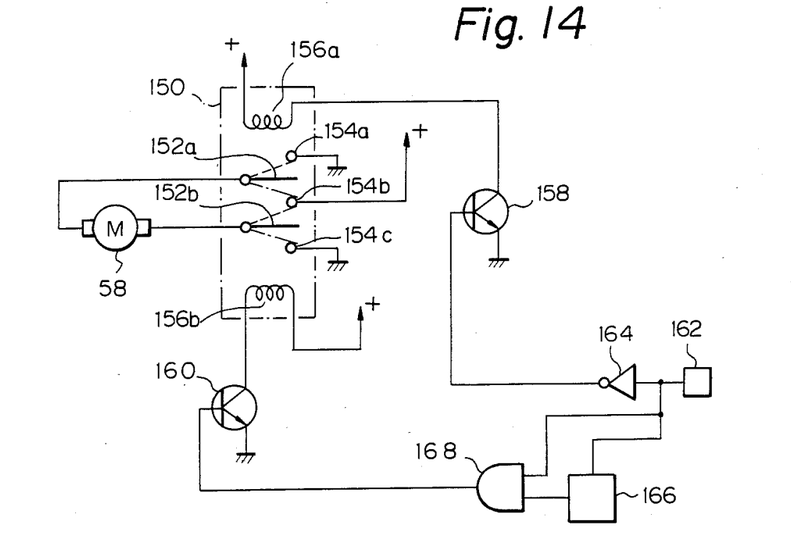
FIG. 14 is a wiring diagram of the switching circuit suitable for use in the retractor according to the second embodiment of the invention.

FIG. 14 illustrates a switching circuit suitable for use in such a modification. The circuit comprises a relay 150 having a pair of movable contacts 152a and 152b, three fixed contacts 154a, 154b, and 154c, and a pair of coils 156a and 156b. The relay coil 156a is connected to the collector of a transistor 158 and serves when energized to shift the movable contacts 152a and 152b into contact with the fixed contacts 154a and 154b as shown by the dotted line. The relay coil 156b is connected to the collector of a transistor 160 and adapted to shift the movable contacts into engagement with the fixed contacts 154b and 154c as shown by the chain line. The movable contacts are held in a neutral position as shown by the solid line when neither of the relays 156a and 156b is energized. The fixed contacts 154a and 154c are grounded while the central contact 154b is connected to a power source. The switching circuit also includes a reed switch 162 connected through an inverter 164 to the base of the transistor 158. The reed switch 162 is similar to the switch 82 of the circuit shown in FIG. 6 and may be arranged on the retractor housing opposite the permanent magnet segment as shown in FIG. 7 in such a manner that the reed switch 162 is turned on in the latched condition of the trigger mechanism 30 and is turned off in the released condition thereof. The reed switch is also connected to the input gate of a timer circuit 166 and to the input gate of an AND circuit 168. The output gate of the timer 166 is connected to the other input gate of the AND circuit 168. The timer circuit 166 is adapted to be reset and start counting upon receipt of a high potential pulse from the reed switch 162 and is preset to issue a high potential signal for a predetermined time interval.

When the trigger mechanism 30 is released to take up a slack in the seat belt in the emergency situation of the vehicle, the reed switch 162 is turned off and issues a zero potential signal which is inverted by the inverter 164 into a high potential signal which is fed to the base of the transistor 158, whereby the transistor 158 is activated and permits electric current to flow through the relay coil 156a. The coil 156a, thus energized, attracts the movable-contacts 152a and 152b into engagement with the fixed contacts 154a and 154b so that the motor 58 is turned in a first direction to rewind the slack-take-up spring 26.

Upon completion of rewinding, the latch lever 36 swings into the latch position so that the reed switch 162 is turned on, thereby terminating energization of the motor 58. Simultaneously, the reed switch 162 issues a high potential signal to the input gate of the AND circuit 168 and the input gate of the timer circuit 166. The timer circuit 166 issues a high potential signal to the AND circuit 168, which is activated to in turn activate the transistor 160, thereby energizing the relay coil 156b so that the movable contacts 152a and 152b are shifted into the second position shown by the chain line to rotate the motor in the reverse direction. As a result, the worm wheel 110 is turned in the clockwise direction as viewed in FIG. 12, thereby disengaging the second one-way clutch 104. After a lapse of a predetermined time period, the timer circuit 166 is turned off and the motor is de-energized.

While the present invention has been described herein with reference to the specific embodiments thereof, it is to be understood that the invention is not limited thereby but various changes and modifications may be made therein for those skilled in the art without departing from the scope of the invention.

We claim:

1. A seat belt retractor for a safety seat belt system of a motor vehicle, which comprises:
   (a) a body;
   (b) a retracting reel mounted for rotation on said body and designed to retain an end of a seat belt;
   (c) first spring means for constantly biasing said reel in a predetermined rotational direction to wind the belt thereon;
   (d) a drive shaft mounted for rotation with respect to said body and arranged coaxially with and adjacent to said reel;
   (e) second spring means for constantly biasing said drive shaft in said direction, said second spring means having a spring force substantially greater than that of said first spring means and comprising a spiral spring having an inner and an outer end, the inner end of said spiral spring being connected to said drive shaft;
   (f) normally disengaged one-way clutch means for transmitting the rotation in said direction of said drive shaft to said reel when engaged;
   (g) trigger means responsive to an emergency situation of the vehicle for engaging said clutch means to couple said drive shaft with said reel causing it to rotate in said direction under the action of said second spring means, thereby taking up a slack that would be present in the seat belt, said trigger means precluding rotation of said drive shaft during a non-emergency situation of the vehicle and releasing said drive shaft to rotate in the emergency situation; and
   (h) means including an electric motor, for rewinding said second spring means to build up a spring energy therein once the previously built-up spring energy is released in the emergency situation of the vehicle, said rewinding means further including a rewinding gear rotatably mounted with respect to said body coaxially with said drive shaft and driven by said electric motor in said rotational direction, the outer end of said spiral spring being connected to said rewinding gear for resetting said spiral spring on rotation of said rewinding gear.

2. A retractor according to claim 1, wherein said rewinding gear has an integral barrel portion in which said spiral spring is received and to which the outer end of said spiral spring is connected.

3. A retractor according to claim 2, wherein said trigger means comprises a movable member movable from a first position corresponding to non-detection of said emergency situation into a second position corresponding to detection of said emergency situation and wherein said means for rewinding said second spring means comprises a switching circuit for energizing said electric motor in response to the movement of said movable member from said first position to said second position.

* * * * *

UNITED STATES PATENT AND TRADEMARK OFFICE

Certificate

Patent No. 4,579,294                                Patented April 1, 1986

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Kazuo Sakakibara, Toshiaki Shimogawa, Satosi Kuwakado, and Masahiro Iwatsuki.

Signed and Sealed this 3rd Day of February, 1987.

BRADLEY R. GARRIS,
*Office of the Deputy Assistant Commissioner for Patents.*